(12) United States Patent
Michaud et al.

(10) Patent No.: US 7,791,029 B2
(45) Date of Patent: Sep. 7, 2010

(54) DIGITAL IDENTIFICATION AND VECTOR QUANTIZATION METHODS AND SYSTEMS FOR DETECTOR CRYSTAL RECOGNITION IN RADIATION DETECTION MACHINES

(75) Inventors: Jean-Baptiste Michaud, Montreal (CA); Hicham Semmaoui, Sherbrooke (CA); Nicolas Viscogliosi, Sherbrooke (CA); Rejean Fontaine, Sherbrooke (CA); Roger Lecomte, Sherbrooke (CA)

(73) Assignee: Societe De Commercialisation Des Produits De La Recherche Appliquee-Socpra Sciences Sante Et Humaines, S.E.C., Sherbrooke, Quebec (CA)

( * ) Notice: Subject to any disclaimer, the term of this patent is extended or adjusted under 35 U.S.C. 154(b) by 0 days.

(21) Appl. No.: 12/064,180

(22) PCT Filed: Aug. 18, 2006

(86) PCT No.: PCT/CA2006/001369

§ 371 (c)(1),
(2), (4) Date: Jun. 4, 2008

(87) PCT Pub. No.: WO2007/019708

PCT Pub. Date: Feb. 22, 2007

(65) Prior Publication Data

US 2008/0237475 A1 Oct. 2, 2008

(51) Int. Cl.
*G01T 1/164* (2006.01)
(52) U.S. Cl. .................................. 250/363.03
(58) Field of Classification Search ............ 250/363.02, 250/363.04, 369
See application file for complete search history.

(56) References Cited

U.S. PATENT DOCUMENTS

| 4,843,245 A | 6/1989 | Lecomte |
| 6,346,706 B1* | 2/2002 | Rogers et al. ............ 250/363.04 |
| 6,448,559 B1 | 9/2002 | Saoudi et al. |
| 2003/0116713 A1* | 6/2003 | Cooke et al. ................. 250/369 |
| 2004/0232315 A1* | 11/2004 | Streun et al. ............ 250/214 VT |
| 2005/0061983 A1* | 3/2005 | Stonger et al. ........... 250/363.03 |

FOREIGN PATENT DOCUMENTS

| WO | 2005/038491 | 4/2005 |
| WO | 2005/071438 | 8/2005 |

OTHER PUBLICATIONS

Yoshida et al., "Calibration Procedure for a DOI Detector of High Resolution PET Through a Gaussian Mixture Model," IEEE Transactions on Nuclear Science, vol. 51, No. 5, Oct. 2004, pp. 2543-2549.

(Continued)

*Primary Examiner*—David P Porta
*Assistant Examiner*—Marcus H Taningco
(74) *Attorney, Agent, or Firm*—Fay Kaplun & Marcin, LLP

(57) ABSTRACT

A digital method and system allowing crystal identification in radiation detector machines is described. The crystal identification is based on recognition of radiation detector signal shape through discrimination of detector signal's dynamic characteristics. The digital method is based on recursive and non-recursive algorithms, such as adaptive filtering combined or not with quantization methods. These digital algorithms, commonly used in other engineering applications, were modified and tailored for radiation detection. Although the method was specially designed for crystal identification measurement, which is exemplified here, it can effectively recognize the detector signal shape in any radiation detection context.

40 Claims, 8 Drawing Sheets

OTHER PUBLICATIONS

Casey et al., "A multicrystal two dimensional BGO detector system for positron emission tomography", IEEE Transactions on Nuclear Science, vol. 33, No. 1, Feb. 1986, pp. 460-463.

Henrichs et al., "Design optimization of the PMT-ClearPET prototypes based on simulation studies with GEANT3", IEEE Transactions on Nuclear Science, vol. 50, No. 5, Oct. 2003, pp. 1428-1432.

Holte et al., "A preliminary evaluation of a dual crystal positron camera", Journal of Computer Assisted Tomography, vol. 11, No. 4, Jul./Aug. 1897, pp. 691-697.

Lecomte et al., "Initial results from the Sherbrooke avalanche photodiode positron tomography", IEEE Transactions on Nuclear Science, vol. 43, No. 3, Jun. 1996, pp. 1952-1957.

Miyaoka et al., "Design of a depth of interaction (DOI) PET detector module", IEEE Transactions on Nuclear Science, vol. 45, No. 3 pt. 2, Jun. 1998, pp. 1069-1073.

Pichler et al., "Sudies with a Prototype High Resolution PET Scanner based on LSO-APD Modules", IEEE Transactions on Nuclear Science, vol. 45, No. 3, Jun. 1998, pp. 1298-1302.

Saoudi et al., "Investigation of depth-of-interaction by pulse-shape discrimination in multicrystal detectors read out by avalanche photodiodes", IEEE Transactions on Nuclear Science, vol. 46, No. 3, Jun. 1999, pp. 462-467.

Schmand et al., "Advantages using pulse shape discrimination to assign the depth of interaction information (DOI) from a multi layer phoswich detector", IEEE Transactions on Nuclear Science, vol. 46, No. 4 pt. 2, Aug. 1999, pp. 985-990.

Seidel et al., "Depth identification accuracy of a three layer phoswich PET detector module", IEEE Transactions on Nuclear Science, vol. 46, No. 3 pt 2, Jun. 1999, pp. 485-490.

Seidel et al., "Scintillator identification and performance characteristics of LSO and GSO PSMPT detector modules combined through common X and Y resistive dividers", IEEE Transactions on Nuclear Science, vol. 47, No. 4 II, Aug. 2000, pp. 1640-1645.

* cited by examiner

FIG_4

|  | ARMAX-RLS | AR-RLS | AR-LMS |
|---|---|---|---|
| BGO − LSO | ~0 | 1.01 | 7.2 |
| BGO − GSO | ~0 | 1.78 | 12.5 |
| BGO − LYSO | ~0 | 2.26 | 8.5 |
| GSO − LSO | ~0 | 5.51 | 1.6 |
| GSO − LYSO | ~0 | 5.77 | 2.5 |
| LSO − LYSO | ~0.5 | 5.5 | 1.3 |
FIG_8
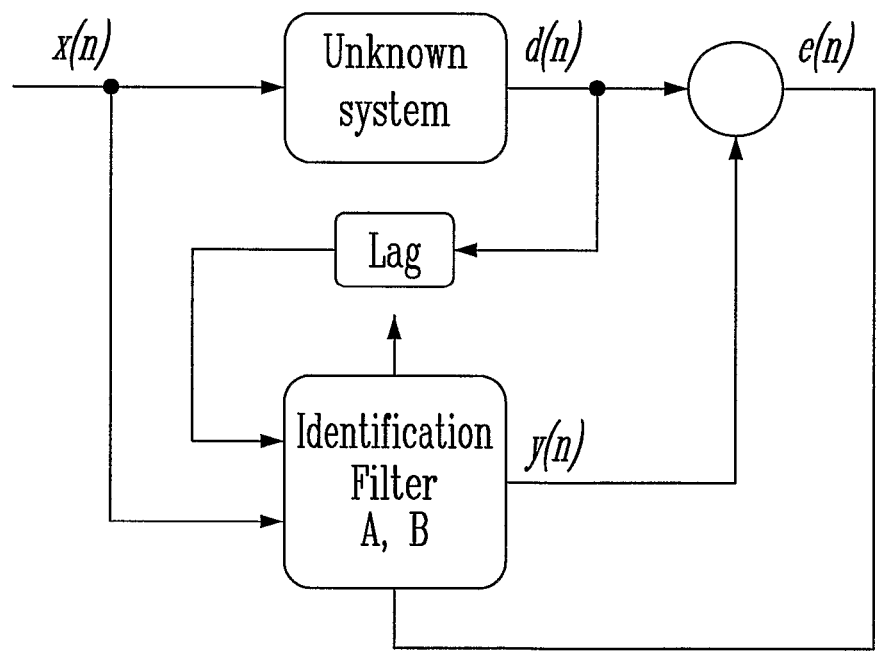
$x(n)$: Unknown system input signal
$d(n)$: Unknown system output
$y(n)$: Identification filter output signal
$e(n)$: error estimation signal
$A$: Identification filter recursive coefficients
$B$: Identification filter non-recursive coefficients
FIG_9

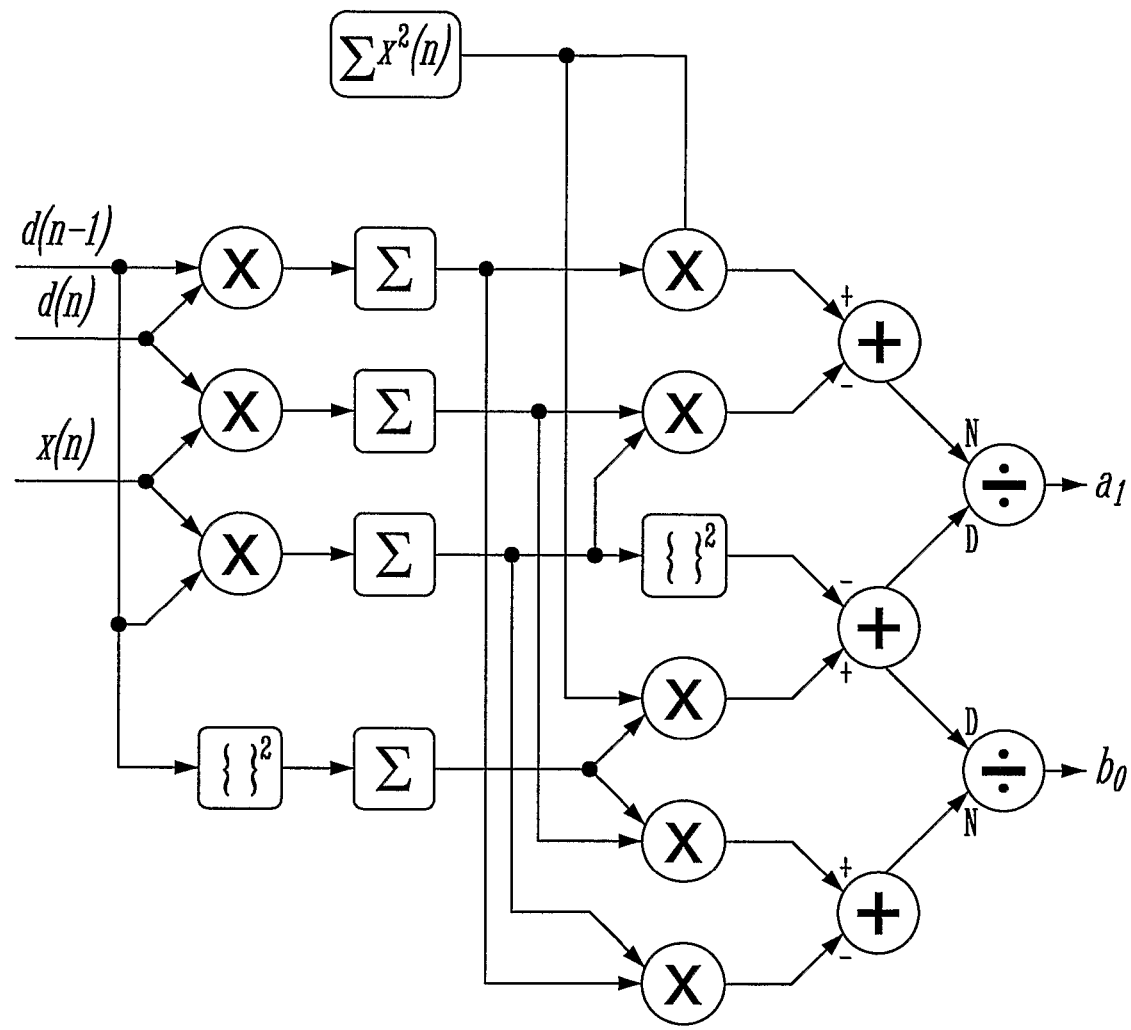
FIG_10

DIGITAL IDENTIFICATION AND VECTOR QUANTIZATION METHODS AND SYSTEMS FOR DETECTOR CRYSTAL RECOGNITION IN RADIATION DETECTION MACHINES

BACKGROUND OF THE INVENTION

Positron Emission Tomography (PET) is a medical imaging modality that allows studying metabolic processes of cells or tissues such as glucose transformation in energy. PET uses the coincident detection of two co-linear 511 keV photons emitted as a result of positron annihilation to reconstruct the spatial distribution of positron-emitting radiolabelled molecules within the body. Current PET human scanners can achieve 4-6 mm resolution and the scanner ring is large enough to let the patient occupy a relatively small portion of the field of view. On the other hand, small animal PET scanners have a smaller ring diameter (~15 cm) and must achieve a higher resolution than their human counterpart ($\leq 2$ mm), which requires increasing the detector pixel density. In addition, because of the small diameter ring and large aspect ratio of long (~2 cm) versus small-section (<4 mm$^2$) detectors that are pointing toward the scanner center, an error occurs on the position of detection of the annihilation photons (511 keV) in the detector, as the depth of interaction of the photons in scintillators is not detected. For instance, depending on its entrance angle into the detector, a photon could be detected only in an adjacent detector. This error, which is known as parallax error, increases as the positron annihilation occurs further away from the scanner center because the Depth Of Interaction (DOI) within the crystals is not measured.

Various detector designs based on photomultiplier tubes (PMT) or Avalanche PhotoDiodes (APD) have been proposed so far. Most current PET scanners are based on arrays of single channel or dual-channel PMTs [1,2], position sensitive PMTs (PS-PMT) [3], or multi-channel PMTs (MC-PMT) [4,5] coupled to large matrices of scintillation crystals. PMTs are selected for their ease of use which results from their low noise contribution and high gain in PET data acquisition (DAQ) chain. However, PMTs are bulky and do not allow individual readout of scintillation crystals in densely packed arrays. When a 511 keV gamma ray hits one crystal in the matrix, the whole detector block is read out by several single-channel PMTs, or by one PS- or MC-PMT that gets blinded for the whole duration of this event (~1 μs). The larger the crystal matrix and PMT, the lower is the overall count rate of the PET detector. Moreover, the decoding schemes that must be used to identify the crystal of interaction, based on the computation of the center of mass of the scintillation light pulse measured by several PMT channels, add some uncertainty to the actual position of detection. This technique limits the overall spatial resolution of PMT-based detectors. As a result, PMT-based PET detectors suffer of low count rate capabilities and reduced spatial resolution.

Due to these limitations, APD-based detection systems, which allow individual coupling of scintillation crystal to independent DAQ chains, have been considered for small animals PET scanners [6, 7, 8]. This approach has the advantage of increasing significantly the overall count rate per mm$^2$ of detector area, but it suffers from the high cost of multiple, parallel DAQ channels and from electronic noise problems generated by APD photodetectors themselves.

The mechanical assembly of many PMT- or APD-based structures is still problematic and, while some have reached actual implementations, most did not go beyond simulation studies or laboratory tests. Due to the cost of materials and labor involved, complex mechanical structures can hardly be considered for implementation in industrial products.

Stacks of crystals with different scintillation light responses have been proposed as a simple means to improve DOI or position resolution without increasing the number of DAQ channels [9, 10, 11]. This approach can generally be implemented straightforwardly and can yield excellent results when appropriate signal processing methods are applied. Techniques for crystal identification can be based on pulse shape discrimination [12, 13, 14], statistical analysis [15, 16] or frequency domain transforms [17]. While fairly sophisticated pulse shape discrimination techniques can be easily implemented in analog or digital electronics, these methods perform poorly in noisy environment or with crystals having scintillation characteristics that are relatively similar. The more advanced statistical and frequency domain signal processing techniques that must be implemented in digital electronics generally achieve much superior performance, but are too computationally demanding to be carried out in real time.

SUMMARY OF THE INVENTION

In accordance with a first aspect of the present invention, there is provided a scintillation identifying method for determining which of a plurality of radiation detectors has generated a signal resulting from a scintillation caused by an impact of a radiation therewith, the plurality of radiation detectors being coupled to a data acquisition chain that acquires and processes signals generated by the plurality of radiation detectors, the scintillation identifying method comprising: defining a parameter vector including at least one parameter common to the plurality of radiation detectors; modeling the data acquisition chain; and for each radiation detector of the plurality of radiation detectors: submitting the radiation detector to a source of radiation such that the radiation detector generates at least one scintillation signal; measuring the at least one parameter of the at least one scintillation signal taking into consideration the model of the acquisition chain to yield a specific parameter vector; associating the specific parameter vector with the radiation detector; whereby, in use, the radiation detector that has generated a signal resulting from a scintillation is identified by (a) comparing the parameter vector of the scintillation generated signal with the specific parameter vectors associated with the plurality of radiation detectors and (b) selecting the best match.

In accordance with a second aspect of the present invention, there is provided a scintillation identifying method for determining which of a plurality of radiation detectors has generated a signal resulting from a scintillation caused by an impact of a radiation therewith, the plurality of radiation detectors being coupled to a data acquisition chain that acquires and processes signals generated by the plurality of radiation detectors, the scintillation identifying method comprising: defining a parameter vector including at least one parameter common to the plurality of radiation detectors; modeling the data acquisition chain; and modeling a specific parameter vector for each radiation detector of the plurality of radiation detectors taking into consideration the model of the acquisition chain; whereby, in use, the radiation detector that has generated a signal resulting from a scintillation is identified by (a) comparing the parameter vector of the scintillation generated signal with the modeled specific parameter vectors associated with the plurality of radiation detectors and (b) selecting the best match.

In accordance with a third aspect of the present invention, there is provided a scintillation identifying system for determining which of a plurality of radiation detectors has generated a signal resulting from a scintillation caused by an impact of a radiation therewith, the scintillation identifying system comprising a radiation detection apparatus including a plurality of radiation detectors being coupled to a data acquisition chain that is so configured as to acquire and process signals generated by the plurality of radiation detectors; the radiation detection apparatus being so configured as to: define a parameter vector including at least one parameter common to the plurality of radiation detectors; model the data acquisition chain; and for each radiation detector of the plurality of radiation detectors: submit the radiation detector to a source of radiation such that the radiation detector generates at least one scintillation signal; measure the at least one parameter of the at least one scintillation signal taking into consideration the model of the acquisition chain to yield a specific parameter vector; associate the specific parameter vector with the radiation detector; whereby, in use, the radiation detector that has generated a signal resulting from a scintillation is identified by (a) comparing the parameter vector of the generated signal with the specific parameter vectors associated with the plurality of radiation detectors and (b) selecting the best match.

In accordance with a fourth aspect of the present invention, there is provided an identifying method for determining which of a plurality of radiation detectors has generated a signal resulting from an impact of a radiation therewith, the plurality of radiation detectors being coupled to a data acquisition chain that acquires and processes signals generated by the plurality of radiation detectors, the identifying method comprising: defining a parameter vector including at least one parameter common to the plurality of radiation detectors; modeling the data acquisition chain; and for each radiation detector of the plurality of radiation detectors: submitting the radiation detector to a source of radiation such that the radiation detector generates at least one signal; measuring the at least one parameter of the at least one signal taking into consideration the model of the acquisition chain to yield a specific parameter vector; associating the specific parameter vector with the radiation detector; whereby, in use, the radiation detector that has generated a signal resulting from an impact of a radiation therewith is identified by (a) comparing the parameter vector of the impact generated signal with the specific parameter vectors associated with the plurality of radiation detectors and (b) selecting the best match.

In accordance with a fifth aspect of the present invention, there is provided an identifying method for determining which of a plurality of radiation detectors has generated a signal resulting from an impact of a radiation therewith, the plurality of radiation detectors being coupled to a data acquisition chain that acquires and processes signals generated by the plurality of radiation detectors, the identifying method comprising: means for defining a parameter vector including at least one parameter common to the plurality of radiation detectors; means for modeling the data acquisition chain; and for each radiation detector of the plurality of radiation detectors: means for submitting the radiation detector to a source of radiation such that the radiation detector generates at least one signal; means for measuring the at least one parameter of the at least one signal taking into consideration the model of the acquisition chain to yield a specific parameter vector; means for associating the specific parameter vector with the radiation detector; whereby, in use, the radiation detector that has generated a signal resulting from an impact of a radiation therewith is identified by (a) means for comparing the parameter vector of the impact generated signal with the specific parameter vectors associated with the plurality of radiation detectors and (b) means for selecting the best match.

In accordance with a sixth aspect of the present invention, there is provided an identifying method for determining which of a plurality of radiation detectors has generated a signal resulting from an impact of a radiation therewith, the plurality of radiation detectors being coupled to a data acquisition chain that acquires and processes signals generated by the plurality of radiation detectors, the identifying method comprising: defining a parameter vector including at least one parameter common to the plurality of radiation detectors; modeling the data acquisition chain; and modeling a specific parameter vector for each radiation detector of the plurality of radiation detectors taking into consideration the model of the acquisition chain; whereby, in use, the radiation detector that has generated a signal resulting from an impact of a radiation therewith is identified by (a) comparing the parameter vector of the scintillation generated signal with the modeled specific parameter vectors associated with the plurality of radiation detectors and (b) selecting the best match.

In accordance with a seventh aspect of the present invention, there is provided an identifying method for determining which of a plurality of radiation detectors has generated a signal resulting from an impact of a radiation therewith, the plurality of radiation detectors being coupled to a data acquisition chain that acquires and processes signals generated by the plurality of radiation detectors, the identifying method comprising: means for defining a parameter vector including at least one parameter common to the plurality of radiation detectors; means for modeling the data acquisition chain; and means for modeling a specific parameter vector for each radiation detector of the plurality of radiation detectors taking into consideration the model of the acquisition chain; whereby, in use, the radiation detector that has generated a signal resulting from an impact of a radiation therewith is identified by (a) means for comparing the parameter vector of the scintillation generated signal with the modeled specific parameter vectors associated with the plurality of radiation detectors and (b) means for selecting the best match.

The foregoing and other objects, advantages and features of the present invention will become more apparent upon reading of the following non-restrictive description of an illustrative embodiment thereof, given by way of example only with reference to the accompanying drawings.

BRIEF DESCRIPTION OF THE FIGURES

FIG. 8 lists typical results of identification in the form of misidentification percentage using three different implementations of the recognition algorithm with different crystal combinations.

FIG. 9 is a general diagram of a Wiener filter identifier;

FIG. 10 is a Wiener filter circuit with two parameters, $b_0$ and $a_1$.

DETAILED DESCRIPTION

According to an illustrative embodiment of the present invention, a digital signal processing method and system capable of identifying scintillating crystals among many crystals with different scintillation characteristics in real time in a radiation detection apparatus will now be described. These method and system allow increasing the detector pixel density, and thus the spatial resolution, without increasing the number of electronic data acquisition (DAQ) channels. These method and system can be performed in real time, in a noisy environment and with radiation detectors having fairly similar scintillation characteristics.

Figure 1:
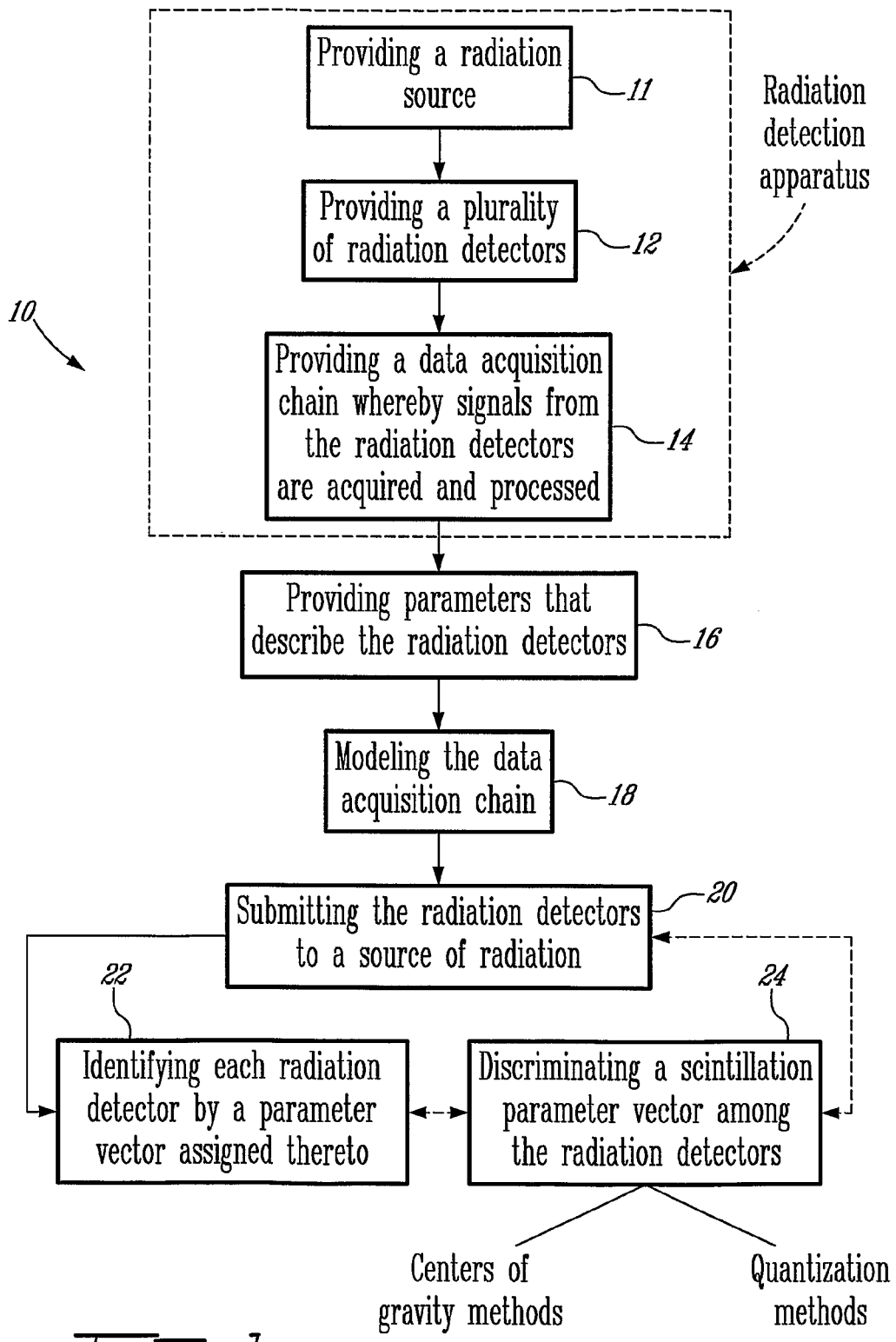
FIG. 1 is a block diagram that describes a method according to an embodiment of the present invention.

Referring now to FIG. 1, the method 10 is generally described. It is to be noted that the method can be materialized as a system, as (i) a software running on various processors such as digital signal processors as well as embedded microprocessors and microcontrollers, (ii) part of a digital system residing on programmable logic chip(s), (iii) part of an integrated circuit. It is to be noted further that the method can be materialized as a system running off-line after data acquisition or on-line, in real time, as the data acquisition is going on.

The step 11 consists in providing a radiation source.

The step 12 of the method consists of providing a plurality of radiation detectors. The radiation detectors can be of any kind, as long as they can produce a signal, such as an electric charge or a scintillation, upon the impact of a radiation thereon. The radiation detectors can be, for example, photo-multiplier tubes, avalanche photodiodes, phoswiches (phosphor sandwiches), organic or non-organic crystals, LSO crystals, GSO crystals, BGO crystals, LYSO crystals, etc.

The step 14 consists in providing a data acquisition (DAQ) chain. The data acquisition chain comprises many channels; however, for the purpose of the present invention, it contains fewer channels than there are radiation detectors. The purpose of the data acquisition chain is to acquire and process signals, through the channels, resulting from scintillations or electric charges in the radiation detectors.

The step 16 is aimed at choosing parameters that describe the radiation detectors; some parameters common to the radiation detectors are chosen so as to further describe the latter, for instance when a scintillation occurs therein. For instance, these parameters can be the shape or intensity of the signal produced in the data acquisition chain. The noise produced therein is also a possible parameter.

The step 18 consists in modeling the data acquisition chain. The data acquisition chain may comprise material and/or electronic components that are connected to the radiation detectors; the modeling step 18 is aimed at understanding the dynamic properties of the DAQ chain. The knowledge of the properties of the radiation detectors and of the electronic components making up the DAQ chain will prove to be useful for the identifying step 22. Noise can be explicitly included as a parameter of the model. The model obtained from step 18 can be chosen from various mathematical domains, such as temporal domain models, frequential domain models, wavelet domain models, Laplace domain models and z-transform domain models, the latter being suitable in the case where the radiation detectors are crystals.

The step 20 consists in submitting the radiation detectors to a source of radiation. Examples of sources of radiation include electromagnetic radiation sources, alpha radiation sources, beta radiation sources, gamma radiation sources and X-ray radiation sources. In the case of a PET scan, the source of radiation is typically an electromagnetic radiation made up of 511 keV photons.

The step 22 consists in identifying each radiation detector by a parameter vector, the values of the components of which characterize individually the radiation detector. In other words, a parameter vector is computed or modeled for each radiation detector. In order to estimate the values of these parameters, curve-fitting, parameter-estimation, least-squares, gradient and adaptive gradient, instrumental variable and/or Wiener-Kalman algorithms and/or methods may be used, as well as other methods used in system command and control theory.

The step 24 consists in discriminating a scintillation parameter vector among the radiation detector parameter vectors, the scintillation parameter vector being associated to a DAQ chain signal resulting from a scintillation. Accordingly, the step 24 allows determining in which radiation detector a scintillation occurred. In other words, the scintillation parameter vector is compared with the computed or modeled parameter vector for each detector and the best match is selected. This is performed by using either centers of gravity methods or vector quantization algorithms. In the first case, algebraic operations are performed so that a particular detector signal falls onto the "center of gravity" associated to a radiation detector. In the second case, the algorithms are derived from pattern recognition methods, such as the ones used for speech recognition and compression but modified and adapted for scintillation detector signal discrimination. Vector quantization algorithms are defined in a vectorial space, the dimension of which is the number of parameters chosen to describe to radiation detectors. Vector quantization algorithms segment the vectorial space into sub-regions for the purpose of deciding which sub-region a particular radiation detector signal belongs to.

More specifically, the present method is generally articulated about the steps 22 and 24, which can be used in cascade, in parallel or separately, in a recursive manner or not. These algorithms analyze the digitized signal and estimate the model parameters. Various estimation algorithms exist, such as parametric estimation algorithms or system command and control theory algorithms, and one is selected depending on the particular model used, on the detection conditions and/or on the desired performance in terms of detector signal discrimination error and of noise. In the crystal identification application, a least-square adaptive gradient method is typically used.

Figure 11:
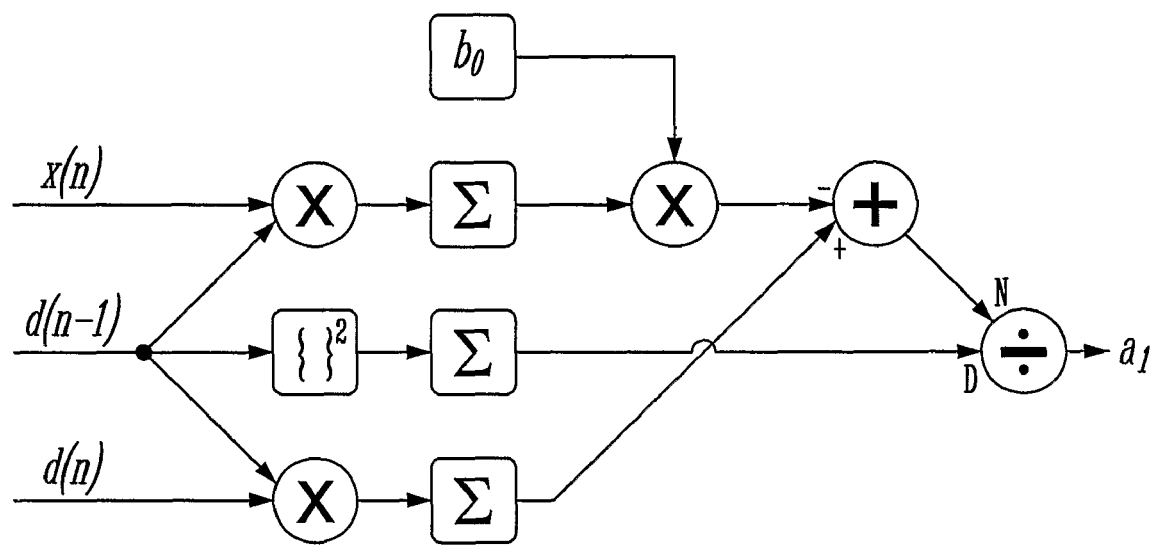
FIG. 11 is a Wiener filter circuit with one parameter, $a_1$.

One illustrative embodiment of step 22, which consists in identifying each radiation detector by a parameter vector assigned thereto, is described hereinbelow. This particular embodiment, which rests on a non-iterative Wiener filter algorithm, is described in reference with FIGS. 9, 10 and 11.

FIG. 9 represents a general diagram of an identifier filter according to an iterative Wiener filter algorithm. The output y(n) of identifier filter is computed under a matricial form according to the equation hereinbelow.

$$y(n) = W^T \cdot Z(n)$$

where $$W^T = [B^T A^T] = [b_0 b_1 \ldots b_N a_1 a_2 \ldots a_M]$$

$$Z(n) = [X^T(n) D^T(n)]^T = [x(n) \ldots x(n-N) d(n-1) \ldots d(n-M)]^T$$

This identifier filter, which is composed of N non-recursive coefficients and M recursive coefficients, is the solution of a least-square objective function of an optimization problem described hereinbelow:

$$J(W) = E\{e^2(n)\} = E\{(d(n)-y(n))^2\}.$$

The coefficients of the Wiener filter are the solution of the following equation.

$$\nabla J(W) = 0$$

with $W_{opt} = R^{-1} \cdot p$, where $$R = E\{Z(n) \cdot Z^T(n)\}$$

$$p = E\{d(n) \cdot Z(n)\}.$$

For a system with non-recursive coefficient ($b_0$) and recursive coefficient ($a_1$), which is the case here, the optimal filter can be obtained with the circuit appearing on FIG. 10. By normalizing signal d(n) from the system, the non-recursive parameter ($b_0$) becomes stable enough to be fixed by the user; in this case, only one degree of freedom is available for optimization and identifying the optimal coefficient $a_1$, boils down to the implementation of the circuit appearing on FIG. 11.

One way to implement step 24 is through vector quantization, i.e. by using algorithms or techniques adapted from other fields such as, for example, speech recognition or video and speech compression. Such algorithms are to be implemented in reference with an N-dimension vector space, to be divided into sub-regions. A search is performed into the N-dimension vector space so as to assign a particular input to a specific sub-region. When the space is defined by any combination of the identified model parameter(s), by the parameter(s) evolution during identification, by the evolution and/or final values of variable(s) in the internal working of the identification step or by the detector signal itself, then the subspaces can effectively represent the different distinguishable detector signals. Hence, the vector quantization step 24 can operate alone to perform the signal shape discrimination, in cascade with the identification step 22, or in parallel fashion where the output of both blocks is fed into a decision arbiter. In the crystal identification example, the steps are configured in cascade.

The vector quantization that can be used in step 24 can take several forms. One possible illustrative embodiment is as follows. First, an $R^k$ vector space is defined, wherein a vector quantizer maps k-dimensional vector into $R^k$ into a finite set of vectors $Y = \{y_i: i=1, 2, \ldots, N\}$. A codevector $y_i$ and a codebook Y are also defined. Each $y_i$ include a region in $R^k$ called a Voronoi region [18]. A search can be made using mathematical operations in order that a particular input "falls" onto the center of gravity of an associated subspace $y_i$. To perform such a search, the input vector is compared to all codewords in the codebook. The codeword that minimizes the distortion is selected and called the winning codeword. According to the present invention, the codebook has as many codewords as crystals to discriminate. The codebook is constructed by placing several known vectors derived form identification process in $R^k$. At this point, planes can be traced to separate Voronoi regions. In the crystal identification step, the search is performed via weighted Euclidian distance measurement between an input and centers of gravity of all subspaces.

The detector signal shape discrimination can exist physically in various forms, either centralized or distributed in the radiation detection machine. It can be implemented as software or as various forms of hardware such as programmable logic chips or custom integrated circuits. In the depth-of-interaction example, the distributed algorithms were realized on programmable logic chips and as software running on digital signal processors.

Figure 2:
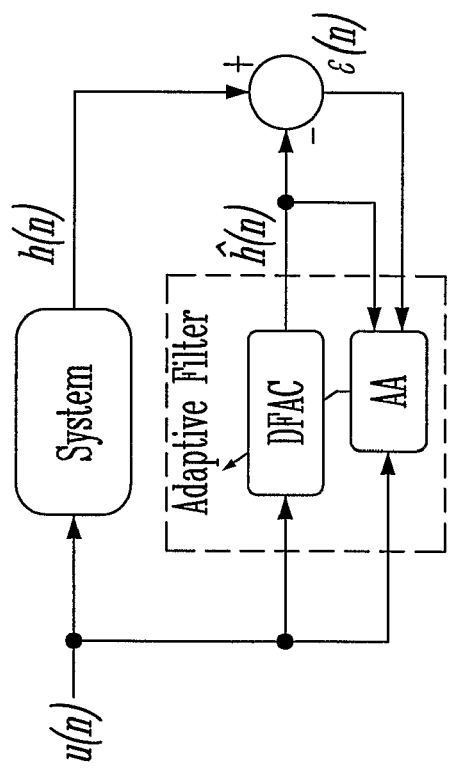
FIG. 2 is a schematic representation of an adaptive filtering based identification scheme.

An embodiment of the identification step 22 has been implemented based on an adaptive filtering scheme shown on FIG. 2. In this diagram, h(n) represents the sample at the output of the DAQ chain called the system, obtained from the presentation of an arbitrary input signal u(n) to the system. The adaptive filter tries to mimic the system behavior using a Digital Filter with Adjustable Coefficients (DFAC), where the filter coefficients are updated through an Adaptive Algorithm (AA). The adaptive algorithm minimizes the error $\epsilon(n)$ in order to obtain a representation $\hat{h}(n)$ of the whole system including the crystal. This scheme is better known as AutoRegressive Moving Average (ARMA) algorithm [19]. An exogenous variable can be added to this model for estimating the noise. The algorithm is then called ARMAX.

Figure 3:
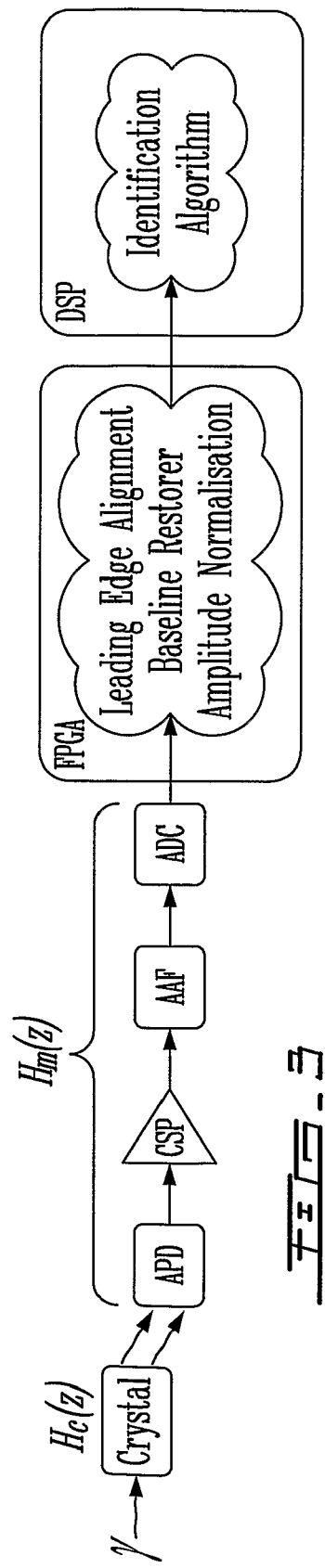
FIG. 3 shows a typical model of a DAQ chain in a radiation detection machine.
Figure 4:
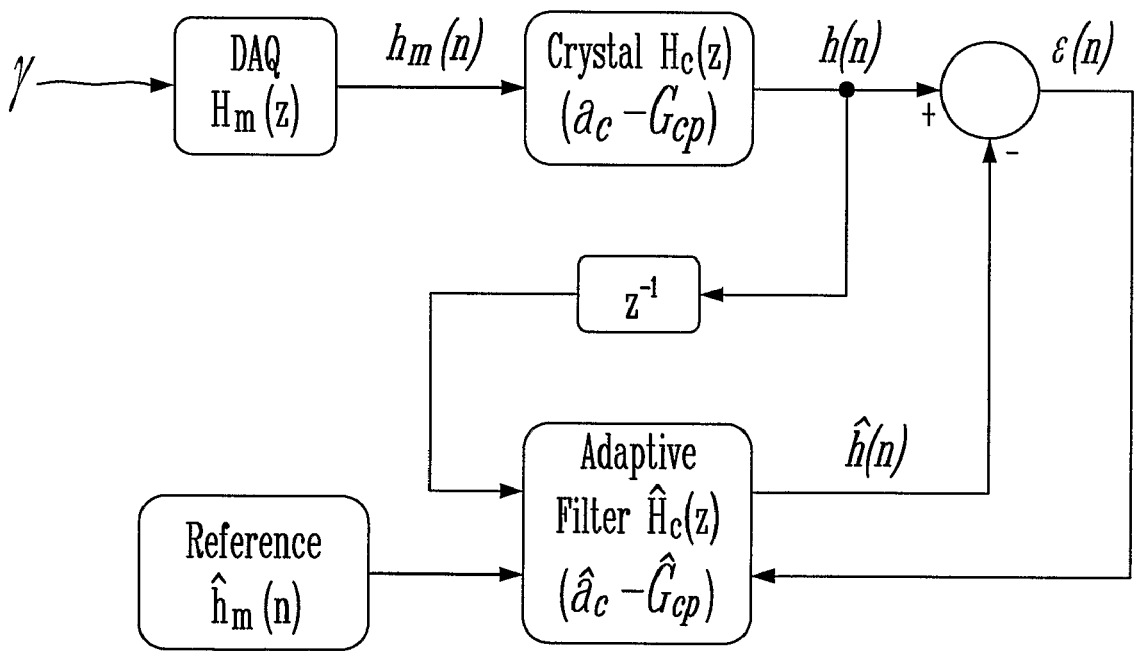
FIG. 4 is a final model of an adaptive filtering detector identification scheme after the different blocks of the adaptive model have been rearranged.

In a real DAQ chain, only the final output data h(n) is accessible, not the signal at the output of the detector, which is embedded in the "system" block, and for the purpose of detector identification, this signal at the output of the detector must be estimated. Some modifications to the adaptive model presented in FIG. 2 must therefore be performed for applying a recursive algorithm to the detector signal model only, rather than to the whole DAQ system. The detector and DAQ are thus modeled by respectively two distinct transfer functions $H_c(z)$ and $H_m(z)$, where $H_c(z)$ represents the detector signal, such as for example the crystal scintillation response, and $H_m(z)$ is used to model the entire electronic signal processing chain, as depicted in FIG. 3. These two separate transfer functions can be rearranged, as shown in FIG. 4, where only h(n) can be accessed, which represent the digitized signal samples at the output of the DAQ system. A reference impulse response function $\hat{h}_m(n)$ and the DFAC $\hat{H}_c(z)$ are introduced as the theoretical digital model of the system. The reference function $\hat{h}_m(n)$ incorporates all relevant a priori knowledge about the DAQ, while the adaptive filter represents only the crystal. Upon the detection of a trigger, the reference provides an impulse response of the modeled DAQ chain to the adaptive filter. The estimated system impulse response $\hat{h}(n)$ and the samples h(n) are recursively compared in order to minimize the error $\epsilon(n)$. After convergence to a solution minimizing $\epsilon(n)$, the adaptive filter provides a model of the crystal. Recursive least square (RLS) and least mean square (LMS) methods can be used for finding the solution.

Figure 5:
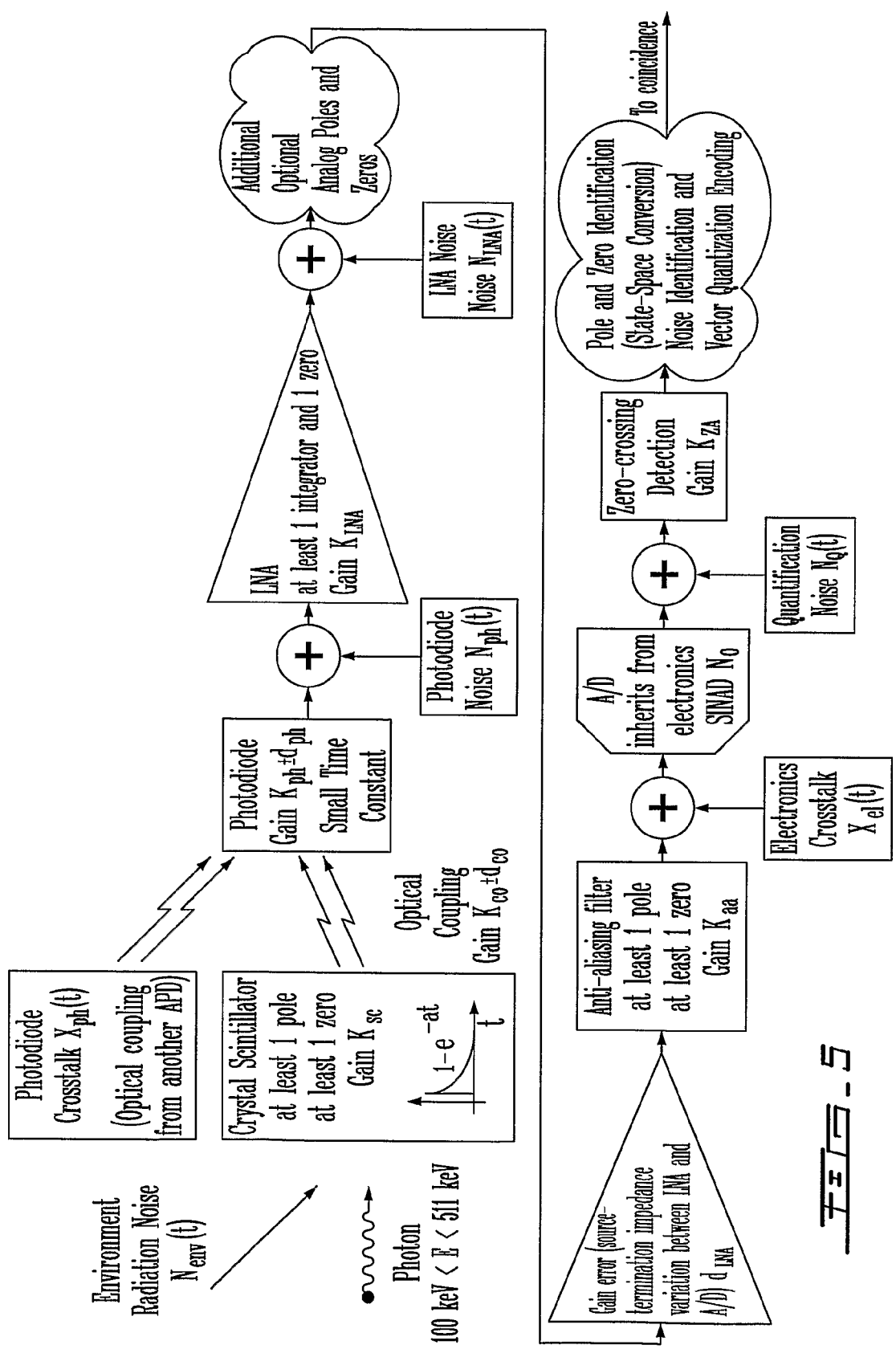
FIG. 5 is a schematic description of a typical DAQ chain including noise contributions from each functional block for a specific application of radiation detection with APD-based detectors in PET imaging.

The implementation of such digital signal processing involves establishing an a priori model of the DAQ system. The establishment of such a knowledge-based model requires a few steps, which are further explained below. A model of each section of the DAQ system can be theoretically established according to the known hardware and software involved therein. FIG. 5 illustrates a typical DAQ system for the specific application of coincidence detection in PET. Noise contributions can be added to the model if desired. It is to be noted that the more complex is the model, the more accurate is the identification step but the harder is the real time processing implementation thereof.

Figure 6:
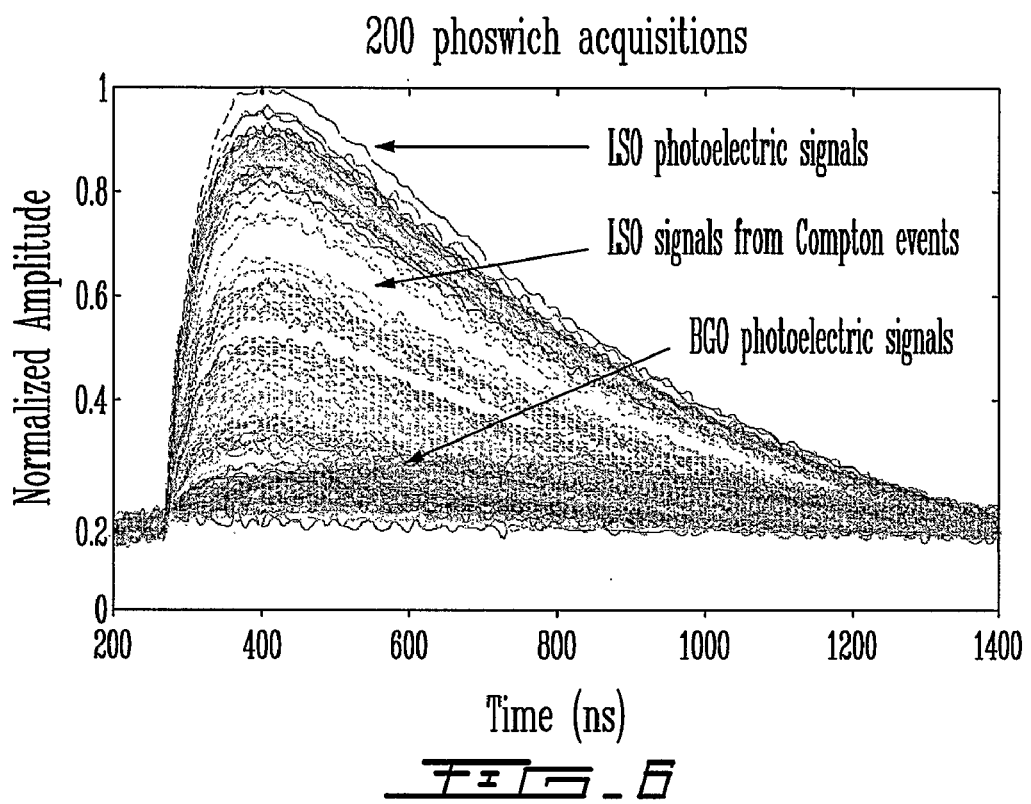
FIG. 6 is an example of typical signals from scintillation detectors as measured at the output of the DAQ chain illustrated in FIG. 5.

A large number of representative signals (>1000) from a real radioactive source are normally acquired with one known detector crystal in place using the DAQ system. The same experiment is repeated with all the different detectors under investigation in order to construct a signal database. FIG. 6 displays examples of such signals acquired from LSO and BGO scintillation crystals. Three zones can easily be identified in this screen shot: signals from photoelectric interactions and lower energy Compton events in LSO, respectively forming the photo peak and Compton continuum in the LSO energy spectrum, and low-amplitude photoelectric signals from BGO, which have a much slower rise time. The typical noise level can also be appreciated from these signals.

From these signals, poles and zeros in the continuous or discrete Laplace domain, or any other suitable transform domain, can be extracted and compared with the theoretical model. Adjustment of the model can be made according to experiments. The final crystal identification rate is directly related to the accuracy of this a priori knowledge.

The adaptation of identification algorithms to radiation detection applications allows substantial simplifications from their original forms, which were developed for system command and control theory [19]. This is made possible due to the extensive a priori knowledge of the system being identified in radiation detection. The application also pursues a slightly different finality, i.e. better parameter separation rather than absolute parameter variance, mean and error.

Figure 7:
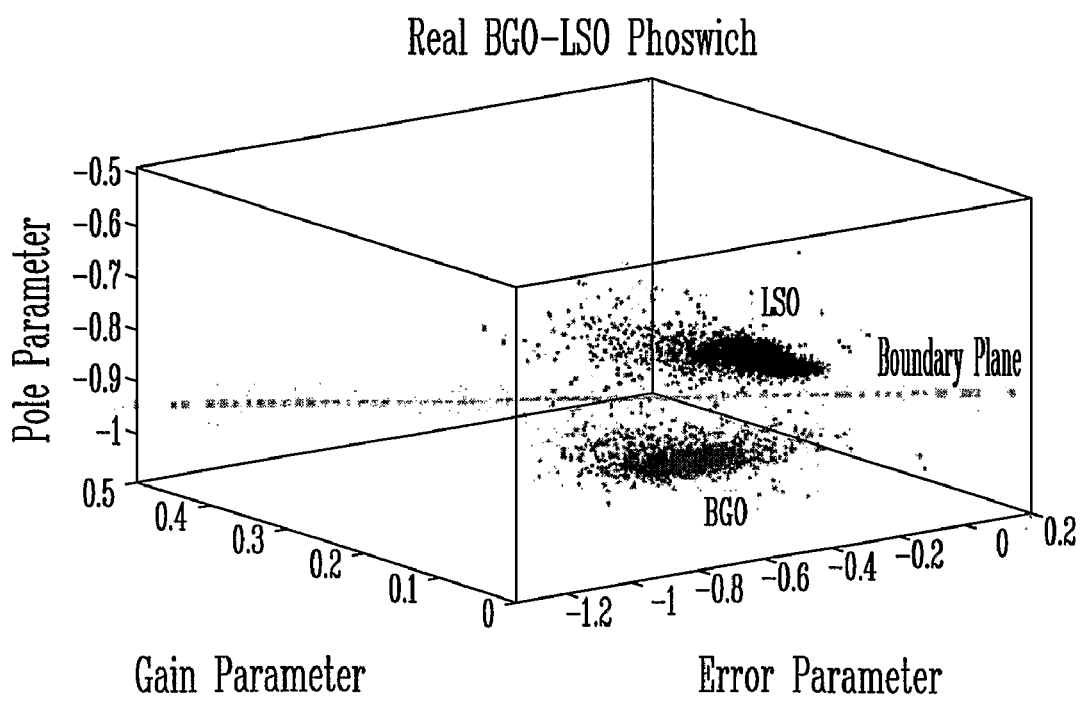
FIG. 7 is a 3-D representation of a parameter space for crystal identification for the results of FIG. 6.

Once the reference impulse response function $\hat{h}_m(n)$ has been established, the acquired signals is analyzed to extract a set of DFAC coefficients that can be associated to crystal parameters such as poles, zeros, gain and noise contribution. Experiments have revealed that a single pole with a gain and an error estimations provides an adequate set of parameters for identifying a scintillating crystal. The extracted parameters of each of a large number of detector samples can be plotted in a multidimensional space plot. FIG. 7 shows an example of a 3-parameter space plot. Each detector has its own characteristics and will occupy a different zone in this space. FIG. 7 presents two species, namely LSO and BGO scintillators.

From this point, two techniques can be used for the discriminating step 24. The first technique consists of calculating the center of gravity of each species. A fair number of samples from each species (typically about 1000) are needed to define the centers of gravity of each species in this approach. Boundary planes can be traced between species for identification. FIG. 7 shows such a plane separating two species, LSO and BGO crystals. The Euclidian distance maximizing the discrimination between the two species can be calculated.

The second technique uses a more complex space segmentation called the vector quantization. In this approach, more samples of each species are needed (about 20 000) for each of the BGO, GSO, LYSO, LSO etc.... crystals, for instance. The mean of each parameter is calculated for each species ($Ac_{mean}$). Then a vector of 40 000 parameters is created issued from the two species to discriminate. A recursive calculation is performed for extracting the new ($Ac_{mean1}$) and ($Ac_{mean2}$) of each species:

Initialisation of Vector:

$Y=\{Y_i, i=1 \ldots N\}$

Update of all codewords $D_i$ where:

$D_i=\{S/\|S-W_i\|<\|S-W_j\|, \text{ for all } i \neq j\}$

Calculation of the mean quadratic error:

$EQM=(1/N)*\Sigma\|S-W_i\|2, S \epsilon D_i$

Stop iteration if $|(EQM(t)-EQM(t-1))/EQM(t-1)|<£$ where £ is a real positive constant (~£=10-12)

Replace each codeword WI with the new gravity center of D and return to 2).

FIG. 8 presents selected results in the form of misidentification percentage obtained using various implementations of the proposed crystal identification algorithms: ARMAX and AR with two different known methods for evaluating the error $\epsilon(n)$ (LMS: least mean squares) and (RLS: recursive least square).

These coefficients will first be define for the LMS methods:

w(n): Coefficients filter matrix
u(n): Input signal
h(n): Output of acquired data from the real DAQ chain
$\hat{h}_m(n)$: Impulse response of the known DAQ model
where $$w(n) = \begin{bmatrix} \hat{a}_c(n) \\ \hat{G}_{cp}(n) \end{bmatrix}, u(n) = \begin{bmatrix} \hat{h}_m(n) \\ h(n-1) \end{bmatrix}$$

The error $\epsilon(n)$ can then be calculated with the recursion $\epsilon(n)=h(n)-w^T(n)\cdot u(n)$ $w(n+1)=w(n)+\mu\cdot\epsilon(n)\cdot u(n)$ where $\mu$ is a constant that modifies the convergence speed $(0.001<\mu<1)$.

The RLS is calculated with the recursive algorithms by the equations:

$$\varepsilon(n) = h(n) - w^T(n-1)\cdot u(n)$$
$$w(n) = w(n-1) + K(n)\cdot \varepsilon(n)$$
$$K(n) = \frac{P(n-1)\cdot u(n)}{\lambda + u^T(n)\cdot P(n-1)\cdot u(n)}$$
$$P(n) = \lambda^{-1}(P(n-1) - K(n)\cdot u^T(n)\cdot P(n-1))$$

where the matrixes P(n) and K(n) are intermediate variables to the iteration calculation. To update the DFAC coefficients efficiently, a positive scalar noted A is defined and is fixed by the user.

For both algorithm, when the output $\hat{h}(n)$ of the DFAC converges to the output h(n) of acquired data from the real DAQ chain, the adaptive filter coefficients, $\hat{a}_c$ and $\hat{G}_{cp}$, correspond to the real crystal coefficients, $a_c$ and $G_{cp}$, the error $\epsilon(n)$ tends to zero and the identification is done.

The illustrative embodiment of the method described here only represents one mean provided by way of example to identify a radiation detector among a plurality of the same, but is not limited to this method. Many other methods and implementations of the methods based on a similar approach can be used. All the proposed methods herein include a model of the DAQ system where an identification process can be performed, followed or not by a more or less complex quantization algorithm.

As will easily be understood by one skilled in the art, the method according to the present invention allows recognizing the shape of the signal produced by radiation detectors such as those used in positron emission tomography, single photon emission computed tomography, X-ray computed tomography or any other radiation detection machines, where such method uses system's, radiation detectors and individual components properties modeling for aid in the recognition.

A raw signal shape discrimination from scintillations in radiation detectors can be performed by coupling the radiation detectors to photodetectors, the photodetectors being photodiodes, avalanche photodiodes, photomultiplier tubes, or any other suitable photosensitive devices.

A vertical stackup of different scintillation materials, especially in positron emission tomography can be realized for depth-of-interaction measurement in phoswich radiation detectors.

It is also possible to improve spatial resolution by means of lateral stacking of said different scintillation materials, especially either in positron emission tomography or in other medical imaging devices operating in photon counting mode.

Combined depth-of-interaction and spatial resolution measurement can be obtained by means of vertical and lateral stacking of phoswich detector leading to a 3-D crystal matrix, especially in positron emission tomography or in other medical imaging device operating in photon counting mode.

The method described hereinabove can be used to reduce the overall number of required data acquisition channels.

The crystal identification can be performed with radiation signals in different energy ranges, for example from X-ray (~30 keV), annihilation photons (~511 keV) and up to high energy gamma rays.

The present signal processing method is also suitable for phoswich detectors, i.e. matrix of phoswich detectors. For example, it can be used for purposes such as parallax mitigation, or for side-by-side crystal stacking in order to increase the crystal-array detector density.

Such detectors can be used for medical imaging applications in nuclear medicine, more specifically in positron emission tomography (PET). One illustrative application of the invention is for depth-of-interaction (DOI) measurement with small animal PET scanners, but applications also include crystal decoding in multi-modality PET/SPECT or PET/CT scanners, and resolution enhancement in similar imaging devices.

Although the present invention has been described hereinabove by way of illustrative embodiments thereof, it can be modified, without departing from the spirit and nature of the subject invention. Moreover, it must be emphasized that it is obvious for one skilled in the art that the illustrative embodiments thereof can be put into practice by using any sensor able to detect a radiation, and in particular any sensor able to detect a radiation using a detection mode other than by scintillation such as semiconductors producing electric charges as a result of a radiation impacting therewith.

REFERENCES

1. Casey M. E., Nutt R. *A multicrystal two dimensional BGO detector system for positron emission tomography*. IEEE Transactions on Nuclear Science, Vol. 33, No. 1, February 1986, pp. 460-463.
2. Wong W.-H., Uribe J., Hicks K., Zambelli M. *A 2-dimensional detector decoding study on BGO arrays with quadrant sharing photomultipliers*. IEEE Transactions on Nuclear Science, Vol. 41, No. 4, pt. 1, August 1994, pp. 453-1457.
3. Seidel, J., Vaquero, J. J., Barbosa, F., Lee, I. J., Cuevas, C., Green, M. V. *Scintillator identification and performance characteristics of LSO and GSO PSPMT detector modules combined through common X and Y resistive dividers*. IEEE Transactions on Nuclear Science, Vol. 47, No. 4 II, August 2000, pp. 1640-1645.
4. Heinrichs U., Pietrzyk U., Ziemons, K., *Design optimization of the PMT-ClearPET prototypes based on simulation studies with GEANT3*. IEEE Transactions on Nuclear Science, Vol. 50, No. 5, October 2003, pp. 1428-1432.
5. Yuan-Chuan Tai, Chatziioannou, A. F., Yongfeng Yang, Silverman, R. W., Meadors, K., Siegel, S., Newport, D. F., Stickel, J. R., Cherry, S. R. *MicroPET II: design, development and initial performance of an improved microPET scanner for small-animal imaging*. Physics in Medicine and Biology, Vol. 48, No. 11, 7 Jun. 2003, pp. 1519-37.
6. Lecomte, R., Cadorette, J., Rodriggue, S., Lapointe, D., Rouleau, D., Bentourkia, M., Yao, P., Msaki, R. *Initial results from the Sherbrooke avalanche photodiode positron tomography*. IEEE Transactions on Nuclear Science Vol. 43, No. 3, June 1996, pp. 1952-1957.
7. Pichler, B., Böning, G., Mirzoyan, R., Pimpl, W., Schwaiger, M., Ziegler, S. I. *Studies with a Prototype High Resolution PET Scanner based on LSO-APD Modules*. IEEE Transactions on Nuclear Science, Vol. 45, No. 3, June 1998, pp. 1298-1302.
8. P. Vaska, C. L. Woody, D. J. Schlyer, S. Shokouhi, S. P. Stoll, J.-F. Pratte, P. O'Connor, S. S. Junnarkar, S. Rescia, B. Yu, M. Purschke, A. Kandasamy, A. Villanueva, A. Kriplani, V. Radeka, N. Volkow, R. Lecomte, and R. Fontaine. *RatCAP: Miniaturized Head-Mounted PET for Conscious Rodent Brain Imaging*. IEEE Trans. on Nuclear Science, Vol. 51, No. 5, pt. 2, October 2004, pp. 2718-22.
9. S Holte, H Ostertag, M Kesselberg. *A preliminary evaluation of a dual crystal positron camera*. Journal of Computer Assisted Tomography, Vol. 11, No. 4, July/August 1987, pp. 691-697.
10. R Lecomte. Scintillation detector for tomographs. U.S. Pat. No. 4,843,245, filed Jun. 27, 1989.
11. A Saoudi, R Lecomte. *Detector assembly for multi-modality scanners*. U.S. Pat. No. 6,448,559, filed 5 Nov. 1999/delivered 10 Sep. 2002.
12. A. Saoudi, C. M. Pepin, E. Dion, M. Bentourkia, R. Lecomte, M. Andreaco, M. Casey, R. Nutt et H. Dautet. *Investigation of depth-of-interaction by pulse-shape discrimination in multicrystal detectors read out by avalanche photodiodes*. IEEE Transactions on Nuclear Science, Vol. 46, No. 3, June 1999, pp. 462-467.
13. Seidel J., Vaquero J. J., Siegel S., Gandler W. R., Green M. V. *Depth identification accuracy of a three layer phoswich PET detector module*. IEEE Transactions on Nuclear Science, Vol. 46, No. 3, pt. 2, June 1999, pp. 485-90.
14. Schmand M., Eriksson L., Casey M. E., Wienhard K., Flugge G., Nutt R. *Advantages using pulse shape discrimination to assign the depth of interaction information (DOI) from a multi layer phoswich detector*. IEEE Transactions on Nuclear Science, Vol. 46, No. 4, pt. 2, August 1999, pp. 985-990.
15. T. Tomitani, Y. Futami, Y. Iseki, S. Kouda et coil. *Depth Encoding of Point-of-interaction in Thick Scintillation Cameras*. Rapport annuel du National Institute of Radiological Science, Japon, disponible en ligne http://www.nirs.go.jp/report/nene/H10/1/001.html, 1999; 1999 IEEE Nuclear Science Symposium. Conference Record, IEEE Cat. No. 99CH37019, Vol. 3, pt. 3, 1999, pp. 1182-6.
16. Miyaoka R. S., Lewellen T. K., Yu H., McDaniel D. L. *Design of a depth of interaction (DOI) PET detector module*. IEEE Transactions on Nuclear Science, Vol. 45, No. 3, pt. 2, June 1998, pp. 1069-73.
17. M. Streun, G. Brandenburg, H. Larue, H. Saleh, E. Zimmermann, K. Ziemons and H. Halling. *Pulse shape discrimination of LSO and LuYAP scintillators for depth of interaction detection in PET*. IEEE Transactions on Nuclear Science, Vol. 50, No. 3, pt. 2, June 2003, pp. 344-347.
18. A. Gersho and R. M. Gray. *VQ and signal compression*. Kluwer, 732 p., 1992.
19. L. Ljung. *System Identification: theory for the user*. Prentice Hall, 609 p., 1998.

What is claimed is:

1. A method for identifying one of a plurality of radiation detectors made of different materials having generated a first radiation representative signal in response to detection of a radiation, the plurality of radiation detectors being coupled to a data acquisition chain that acquires and processes first radiation representative signals generated by the plurality of radiation detectors in response to detection of a radiation, the detector identifying method comprising:

defining a parameter vector including coefficients representative of at least one parameter common to the plurality of radiation detectors to characterize intrinsic properties of the different materials of the radiation detectors;

modeling the data acquisition chain;

for each radiation detector of the plurality of radiation detectors:

submitting the radiation detector to a source of radiation such that the radiation detector generates a second radiation representative signal processed through the data acquisition chain;

measuring the parameter vector specific to the radiation detector in response to the second radiation representative signal processed through the data acquisition chain taking into consideration the model of the acquisition chain;

associating the specific parameter vector with the radiation detector; and measuring the parameter vector in response to the first radiation representative signal generated by said one radiation detector taking into consideration the model of the acquisition chain;

whereby, in use, the said one radiation detector that has detected a radiation is identified by (a) comparing the parameter vector measured in response to the first radiation representative signal produced by said one radiation detector with the specific parameter vectors associated with the plurality of radiation detectors and (b) selecting the best match.

2. A detector identifying method as recited in claim 1, wherein each radiation detector is so submitted to the source of radiation that a plurality of second radiation representative signals are generated, whereby a plurality of specific parameter vectors are associated with each radiation detector.

3. A detector identifying method as recited in claim 2, wherein typical values of the plurality of specific parameter vectors are calculated for each radiation detector of the plurality of radiation detectors made of different materials, and wherein zones of parameter space are assigned to the typical values of the respective radiation detectors.

4. A detector identifying method as recited in claim 3, wherein the identification is done by comparing the parameter vector measured in response to the first radiation representative signal produced by said one radiation detector with the calculated typical values of the material of each radiation detector.

5. A detector identifying method as recited in claim 4, wherein the best match selection is done by selecting the radiation detector having the zone of parameter space which encompasses the parameter vector measured in response to the first radiation representative signal generated by said one radiation detector.

6. A detector identifying method as recited in claim 2, wherein vector quantization methods are applied to the plurality of specific parameter vectors for each radiation detector.

7. A detector identifying method as recited in claim 6, wherein applying vector quantization methods includes using a codebook containing codewords.

8. A detector identifying method as recited in claim 7, wherein applying vector quantization methods comprises using algorithms derived from pattern recognition methods selected from the group consisting of speech recognition, video compression and speech compression.

9. A detector identifying method as recited in claim 1, wherein modeling the data acquisition chain includes modeling noise.

10. A detector identifying method as recited in claim 1, wherein defining a parameter vector includes selecting the at least one parameter from the group consisting of poles, zeros, gain and noise.

11. A detector identifying method as recited in claim 1, wherein modeling the data acquisition chain includes using domain models selected from the group consisting of temporal domain models, frequential domain models, wavelet domain models, Laplace domain models and z-transform domain models.

12. A detector identifying method as recited in claim 1, wherein measuring the specific parameter vectors includes extracting poles and zeros of a Laplace domain model or a z-transform domain model and comparing the poles and zeros with the model of the data acquisition chain.

13. A detector identifying method as recited in claim 1, wherein measuring the specific parameter vector from the second radiation representative signal, measuring the parameter vector in response to the first radiation representative signal, or both measuring the specific parameter vector from the second radiation representative signal and measuring the parameter vector in response to the first radiation representative signal include using iterative algorithms.

14. A detector identifying method as recited in claim 13, wherein using iterative algorithms includes using parametric estimation algorithms.

15. A detector identifying method as recited in claim 14, wherein using parametric estimation algorithms includes using algorithms from system command and control theory.

16. A detector identifying method as recited in claim 15, wherein using algorithms from system command and control theory includes using a least-square adaptive gradient method.

17. A detector identifying method as recited in claim 13, wherein using iterative algorithms includes using an adaptive filtering scheme.

18. A detector identifying method as recited in claim 17, wherein using an adaptive filtering scheme includes using a digital filter with adjustable coefficients.

19. A detector identifying method as recited in claim 17, wherein using an adaptive filtering scheme includes using an autoregressive moving average algorithm.

20. A detector identifying method as recited in claim 19, wherein using an autoregressive moving average algorithm further includes an exogenous variable.

21. A detector identifying method as recited in claim 1, wherein measuring the specific parameter vector includes using non-iterative algorithms.

22. A detector identifying method as recited in claim 21, wherein using non-iterative algorithms includes using a Wiener filter algorithm.

23. A detector identifying method as recited in claim 1, wherein the radiation detectors are submitted to a source of radiation by a radiation detection apparatus selected from the group consisting of positron emission tomographs, single photon emission computed tomographs and X-ray computed tomographs.

24. A detector identifying method as recited in claim 1, wherein the comparing of the parameter vectors is performed in real time.

25. A detector identifying method as recited in claim 1, wherein the radiation detectors are selected from the group consisting of phoswich radiation detector, photomultiplier tube radiation detector, avalanche photodiode radiation detector, silicone photomultiplier radiation detector, single photon avalanche photodiode radiation detector, inorganic crystal radiation detector, organic crystal radiation detector and crystal breeds selected from the group consisting of LSO, GSO, BGO and LYSO.

26. A detector identifying method as recited in claim 1, wherein the source of radiation is selected from the group consisting of electromagnetic radiation sources, alpha radiation sources, beta radiation sources, gamma radiation sources and X-ray radiation sources.

27. A detector identifying method as recited in claim 1 wherein one of a Laplace domain model or a z-transform domain model uses a priori modeling of the static parts of the method, whether or not the said method can perform in real-time.

28. A method for identifying one of a plurality of radiation detectors made of different materials having generated a first radiation representative signal in response to detection of a radiation, the plurality of radiation detectors being coupled to a data acquisition chain that acquires and processes first radiation representative signals generated by the plurality of radiation detectors in response to detection of a radiation, the detector identifying method comprising:

defining a parameter vector including coefficients representative of at least one parameter common to the plurality of radiation detectors to characterize intrinsic properties of the different materials of the radiation detectors;

modeling the data acquisition chain;

modeling the parameter vector specific to each radiation detector of the plurality of radiation detectors, taking into consideration the model of the acquisition chain; and measuring the parameter vector in response to the first radiation representative signal generated by said one radiation detector taking, into consideration the model of the acquisition chain;

whereby, in use, the said one radiation detector that has detected a radiation is identified by (a) comparing the parameter vector measured in response to the first radiation representative signal generated by said one radiation detector with the modeled parameter vectors specific to the plurality of radiation detectors and (b) selecting the best match.

29. A system for identifying one of a plurality of radiation detectors made of different materials having generated a first radiation representative signal in response to detection of a radiation, the detector identifying system comprising a radiation detection apparatus including the plurality of radiation detectors being coupled to a data acquisition chain that is so configured as to acquire and process first radiation representative signals generated from the plurality of radiation detectors in response to detection of a radiation; wherein a parameter vector including coefficients representative of at least one parameter common to the plurality of radiation detectors is defined to characterize intrinsic properties of the different materials of the radiation detectors and the data acquisition chain is modeled, the radiation detection apparatus being so configured as to:

for each radiation detector of the plurality of radiation detectors:

submit the radiation detector to a source of radiation such that the radiation detector generates a second radiation representative signal processed through the data acquisition chain;

measure the parameter vector specific to the radiation detector in response to the second radiation representative signal processed through the data acquisition chain taking into consideration the model of the acquisition chain; and associate the specific parameter vector with the radiation detector;

measure the parameter vector in response to the first radiation representative signal generated by said one radiation detector taking into consideration the model of the acquisition chain;

whereby, in use, the radiation detection apparatus identifies said one radiation detector that has detected a radiation by (a) comparing the parameter vector measured in response to the first radiation representative signal produced by said one radiation detector with the specific parameter vectors associated with the plurality of radiation detectors and (b) selecting the best match.

30. A detector identifying system as recited in claim 29, wherein the radiation detection apparatus is selected from the group consisting of positron-emission tomographs, single photon emission computed tomographs and X-ray computed tomographs.

31. A detector identifying system as recited in claim 29, wherein the radiation detection apparatus is further so configured as to compare the parameter vectors in real time.

32. A detector identifying system as recited in claim 29, wherein the radiation detectors are selected from the group consisting of phoswich radiation detector, photomultiplier tube radiation detector, avalanche photodiode radiation detector, silicone photomultiplier radiation detector, single photon avalanche photodiode radiation detector, inorganic crystal radiation detector, organic crystal radiation detector and crystals breeds selected from the group consisting of LSO, GSO, BGO and LYSO.

33. A detector identifying system as recited in claim 29, wherein the source of radiation is selected from the group consisting of positron emission sources, electromagnetic radiation sources, alpha radiation sources, beta radiation sources, gamma radiation sources and X-ray radiation sources.

34. A detector identifying system as recited in claim 29 wherein one of a Laplace domain model or a z-transform domain model uses a priori modeling of the static parts of the system, whether or not the said system can perform in real-time.

35. A system for identifying one of a plurality of radiation detectors made of different materials having generated a first radiation representative signal in response to detection of a radiation, the plurality of radiation detectors being coupled to a data acquisition chain that acquires and processes first radiation representative signals generated by the plurality of radiation detectors in response to detection of a radiation, the detector identifying system comprising:

means for defining a parameter vector including coefficients representative of at least one parameter common to the plurality of radiation detectors to characterize intrinsic properties of the different materials of the radiation detectors;

means for modeling the data acquisition chain;

for each radiation detector of the plurality of radiation detectors:
- means for submitting the radiation detector to a source of radiation such that the radiation detector generates a second radiation representative signal;
- means for measuring the parameter vector specific to the radiation detector in response to the second radiation representative signal processed through the data acquisition chain taking into consideration the model of the acquisition chain;
- means for associating the specific parameter vector with the radiation detector; and
- means for measuring the parameter vector in response to the first radiation representative signal generated by said one radiation detector taking into consideration the model of the acquisition chain;

whereby, in use, the said one radiation detector that has detected a radiation is identified by (a) means for comparing the parameter vector measured in response to the first radiation representative signal produced by said one radiation detector with the specific parameter vectors associated with the plurality of radiation detectors and (b) means for selecting the best match.

36. A system for identifying one of a plurality of radiation detectors made of different materials having generated a first radiation representative signal in response to detection of a radiation, the detector identifying system comprising a radiation detection apparatus including the plurality of radiation detectors being coupled to a data acquisition chain that acquires and processes first radiation representative signals generated by the plurality of radiation detectors in response to detection of a radiation, wherein a parameter vector including coefficients representative of at least one parameter common to the plurality of radiation detectors is defined to characterize intrinsic properties of the different materials of the radiation detectors and the data acquisition chain is modeled, the radiation detection apparatus being so configured as to:
- model the parameter vector specific to each radiation detector of the plurality of radiation detectors made of different materials taking into consideration the model of the acquisition chain; and
- measure the parameter vector in response to the first radiation representative signal generated by said one radiation detector taking into consideration the model of the acquisition chain;

whereby, in use, the radiation detecting apparatus identifies said one radiation detector that has detected a radiation by (a) comparing the parameter vector measured in response to the first radiation representative signal detected by said one radiation detector with the modeled parameter vectors specific to the plurality of radiation detectors and (b) selecting the best match.

37. A method for identifying one of a plurality of radiation detectors made of different materials having generated a first radiation representative signal in response to detection of a radiation, the plurality of radiation detectors being coupled to a data acquisition chain that acquires and processes first radiation representative signals generated by the plurality of radiation detectors in response to detection of a radiation, the detector identifying method comprising:
- choosing at least one parameter common to the plurality of radiation detectors to characterize intrinsic properties of the different materials of the radiation detectors;
- modeling the data acquisition chain;
- for each radiation detector of the plurality of radiation detectors:
  - submitting the radiation detector to a source of radiation such that the radiation detector generates a second radiation representative signal processed through the data acquisition chain;
  - computing at least one parameter specific to the radiation detector in response to the second radiation representative signal processed through the data acquisition chain taking into consideration the model of the acquisition chain; and
  - associating the specific parameter with the radiation detector; and
  - computing at least one parameter in response to the first radiation representative signal generated by said one radiation detector taking into consideration the model of the acquisition chain;

whereby, in use, the said one radiation detector that has detected a radiation is identified by (a) comparing the parameter detected in response to the first radiation representative signal produced by said one radiation detector with the specific parameters associated with the plurality of radiation detectors and (b) selecting the best match.

38. A method as defined in claim 37, wherein said at least one parameter consists of a plurality of parameters.

39. A system for identifying one of a plurality of radiation detectors made of different materials having generated a first radiation representative signal in response to detection of a radiation, the detector identifying system comprising a radiation detection apparatus including the plurality of radiation detectors being coupled to a data acquisition chain that acquires and processes first radiation representative signals generated by the plurality of radiation detectors in response to detection of a radiation, wherein at least one parameter common to the plurality of radiation detectors is chosen to characterize intrinsic properties of the different materials of the radiation detectors and the data acquisition chain is modeled, the radiation detection apparatus being so configured as to:
- for each radiation detector of the plurality of radiation detectors:
  - submit the radiation detector to a source of radiation such that the radiation detector generates a second radiation representative signal processed through the data acquisition chain;
  - compute at least one parameter specific to the radiation detector in response to the second radiation representative signal processed through the data acquisition chain taking into consideration the model of the acquisition chain; and
  - associate the specific parameter with the radiation detector; and
  - compute at least one parameter in response to the first radiation representative signal generated by said one radiation detector taking into consideration the model of the acquisition chain;

whereby, in use, the radiation detection apparatus identifies said one radiation detector that has detected a radiation by (a) comparing the parameter detected in response to the first radiation representative signal produced by said one radiation detector with the specific parameters associated with the plurality of radiation detectors and (b) selecting the best match.

40. A system as defined in claim 39, wherein said at least one parameter consists of a plurality of parameters.

* * * * *